(No Model.) 2 Sheets—Sheet 1.

J. G. WEBB.
SEED PLANTER.

No. 358,311. Patented Feb. 22, 1887.

Witnesses
F. L. Ourand.
Bennett S. Jones.

John Gilbrieth Webb,
Inventor

By his Attorneys
Louis Bagger & Co.

N. PETERS, Photo-Lithographer, Washington, D. C.

(No Model.) 2 Sheets—Sheet 2.
J. G. WEBB.
SEED PLANTER.
No. 358,311. Patented Feb. 22, 1887.
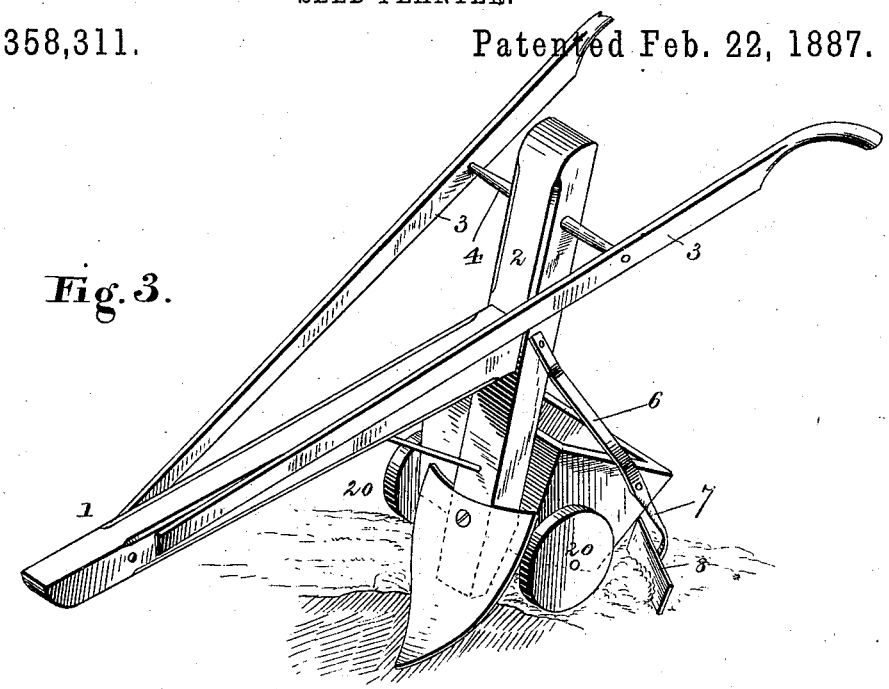
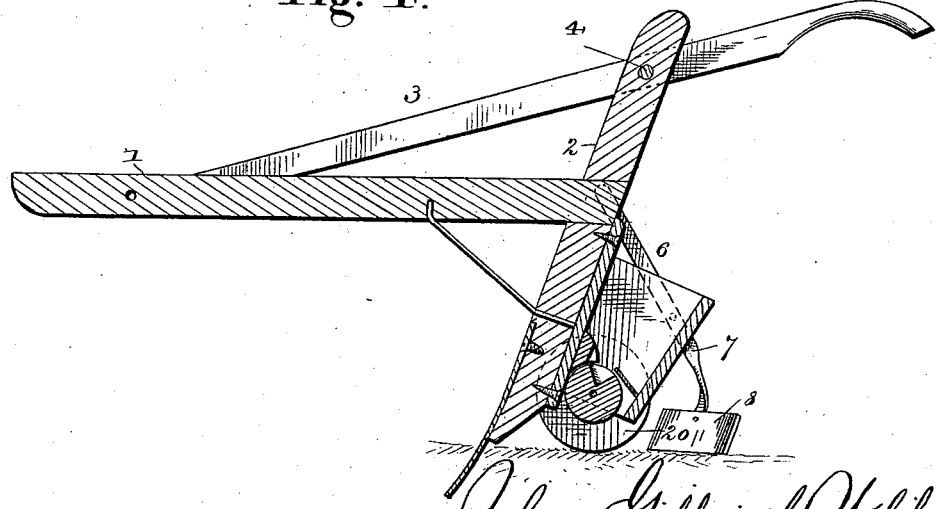
Witnesses
F. L. Ourand
Bennett S. Jones
John Gilbrieth Webb,
Inventor
By his Attorneys
Louis Bagger & Co.
N. PETERS, Photo-Lithographer, Washington, D. C.

UNITED STATES PATENT OFFICE.

JOHN GILBRIETH WEBB, OF LONE CEDAR, WEST VIRGINIA.

SEED-PLANTER.

SPECIFICATION forming part of Letters Patent No. 358,311, dated February 22, 1887.

Application filed November 29, 1886. Serial No. 220,142. (No model.)

*To all whom it may concern:*

Be it known that I, JOHN GILBRIETH WEBB, a citizen of the United States, and a resident of Lone Cedar, in the county of Jackson and State of West Virginia, have invented certain new and useful Improvements in Seed-Planters; and I do hereby declare that the following is a full, clear, and exact description of the invention, which will enable others skilled in the art to which it appertains to make and use the same, reference being had to the accompanying drawings, which form a part of this specification, and in which—

Figure 1:
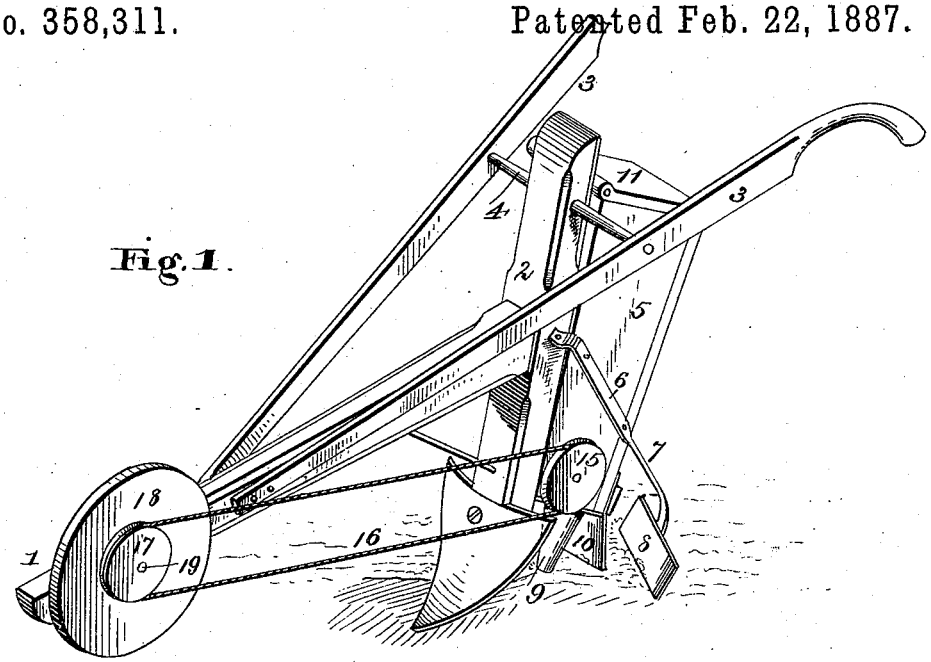
Figure 2:
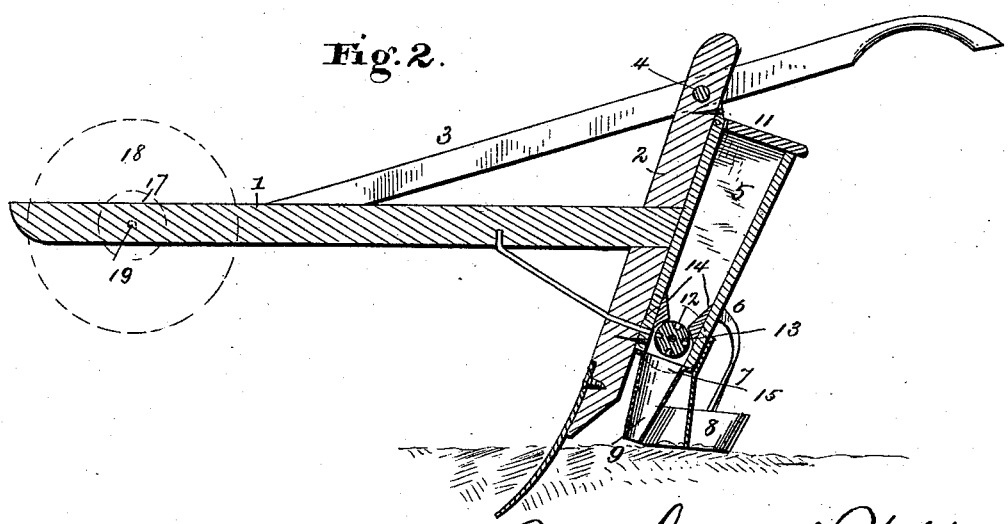

Figure 1 is a perspective view of a plow provided with my improved corn-planting attachment. Fig. 2 is a longitudinal vertical sectional view of the same. Fig. 3 is a perspective view of a plow provided with a potato-planting attachment, and Fig. 4 is a longitudinal vertical sectional view of that form.

Similar numerals of reference indicate corresponding parts in all the figures.

My invention has relation to that class of seeding-machines in which a seed-box having a suitable dropping mechanism is attached to a plow; and it consists in the improved construction and combination of parts of such a machine, in which either a corn-planting device or a potato-planting device may be attached to a common wooden shovel-plow, as hereinafter more fully described and claimed.

In the accompanying drawings, the numeral 1 indicates the plow-beam. 2 is the standard, which is secured in the usual manner to the rear end of the beam, and the handles 3 are secured to the beam and standard in the usual manner, having the cross-piece 4 between them secured to the upper end of the standard.

The seed-box 5 is secured to the rear side of the standard by means of two downwardly and rearwardly inclined flat bars, 6, the rear ends of which are continued into two curved standards, 7, having covering-shovels 8 secured to their lower ends, one shovel being at each side of and to the rear of the spout 9, which extends at the rear of the lower end of the standard, and its shovel 10 from the lower end of the seed-box.

The seed-box is provided with a hinged lid, 11, at its upper end, and a cylinder, 12, is journaled transversely in the lower end of the box, having seed-cups 13 in its periphery, and having inclined cleats or strips 14, secured to the sides of the seed-box, converging toward the cylinder, forming a transverse slot above the same.

When the seed-box for the corn-planting attachment is used, the seed-cylinder is preferably provided with a number of seed-cups arranged in a line parallel with its axis, and one end of the shaft of the cylinder is provided with a pulley, 15, over which passes a belt, 16, which passes over a pulley, 17, upon the hub of a wheel, 18, journaled upon a short stub-axle, 19, upon the forward end of the beam; and it will thus be seen that as the plow is drawn forward by the team the said wheel 18 will be revolved, and the seed-cylinder 12 will be revolved through the medium of the belt 16, dropping the grain, the distance between the hills of grain being regulated by the relative size of the pulleys upon the cylinder-shaft and upon the wheel upon the beam.

When the potato-planting attachment is used, the seed-box is preferably wider than the seed-box used with the corn-planting device, on account of the greater bulk of the seed-potatoes, and the dropping-cylinder, which is preferably formed with only one seed-cup, is provided at its ends with two wheels, 20, which travel upon the ground and support the box and revolve the cylinder, the wheel at the forward end of the beam and the belt being done away with, the said wheel and belt being impracticable in this case, as the weight of the box containing the seed-potatoes resting entirely upon the standard would serve to force the shovel too far down into the ground, and also to drive the drive-wheel too far into the soft ground.

It will be seen that either attachment may be secured to the plow in a moment of time, it being merely necessary to secure the inclined bars forming the upper ends of the standards for the covering-shovels to the sides of the box and to the sides of the standard, when the potato-planting attachment is ready for use, while with the corn-planting device the drive-wheel and belt have to be secured in position beside the box.

The plow will at all times be ready to be used as a simple plow by detaching either of the attachments, nothing in the construction of the plow being changed, and the attachments may be secured to any plow having a wooden beam and standard.

Having thus described my invention, I claim and desire to secure by Letters Patent of the United States—

The combination, with a shovel-plow having a wooden beam and standard, of a seed-box having a seeding-cylinder at its lower end provided with a pulley at one end of its shaft, a wheel journaled upon a stub-axle upon the side of the forward portion of the beam and having a pulley upon its hub, a belt passing over the pulley of the wheel and upon the cylinder-shaft, and two standards for the covering-shovels having flat upper ends secured in a rearwardly-inclined position to the sides of the standard and to the sides of the box, as and for the purpose shown and set forth.

In testimony that I claim the foregoing as my own I have hereunto affixed my signature in presence of two witnesses.

JOHN GILBRIETH WEBB.

Witnesses:
J. W. ARCHER,
W. H. BEYMER.